Aug. 2, 1966 K. SCHEIDHAUER 3,264,609

SCANNING DEVICE

Filed Oct. 24, 1962 3 Sheets-Sheet 1

INVENTOR
Kurt Scheidhauer
BY Spencer & Kaye
ATTORNEYS

INVENTOR
Kurt Scheidhauer
BY Spencer & Kaye
ATTORNEYS

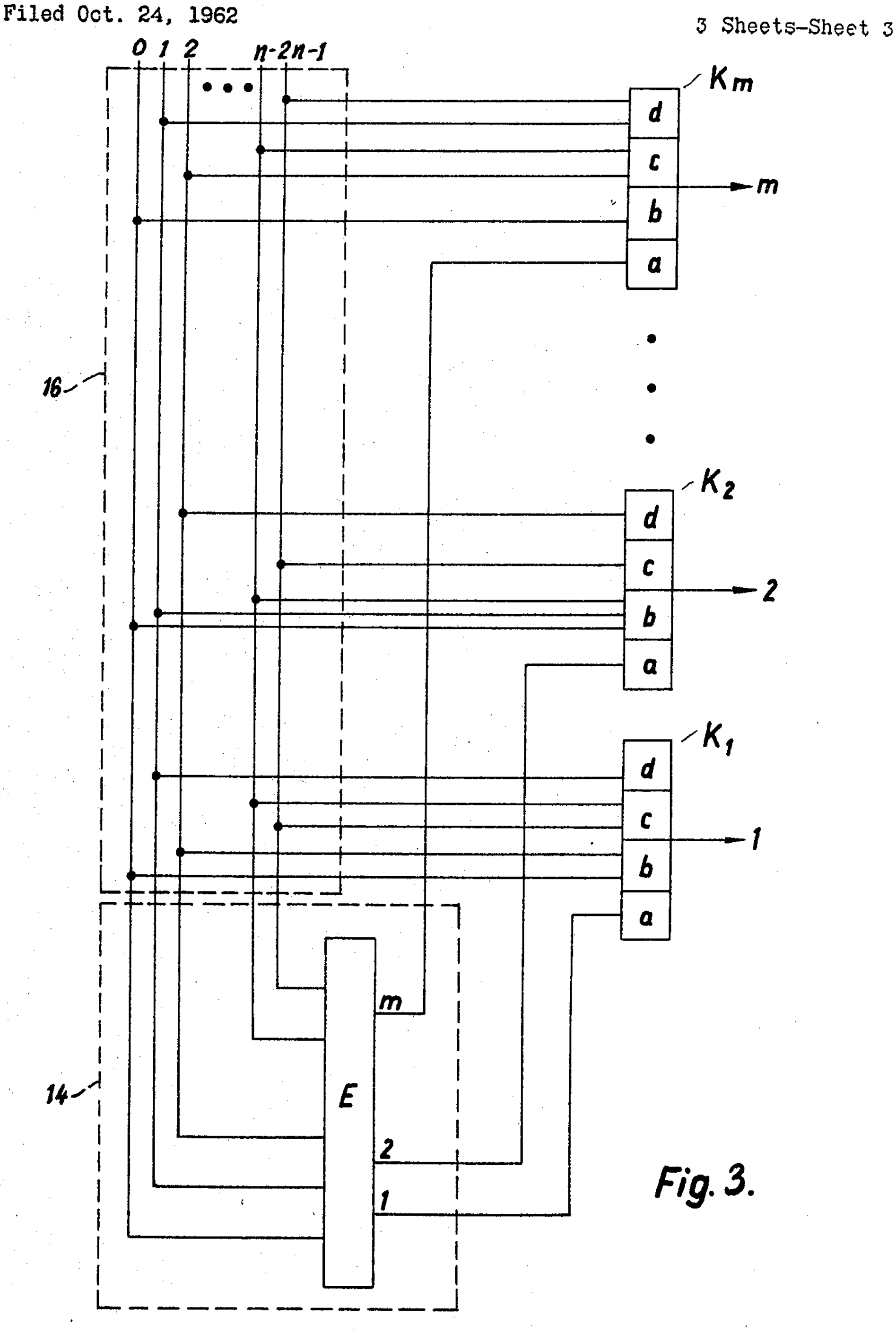
INVENTOR
Kurt Scheidhauer
BY Spencer & Kaye
ATTORNEYS

United States Patent Office 3,264,609
Patented August 2, 1966

3,264,609

SCANNING DEVICE

Kurt Scheidhauer, Allensbach, Germany, assignor to Telefunken Patentverwertungs-G.m.b.H., Ulm (Danube), Germany Filed Oct. 24, 1962, Ser. No. 232,693
Claims priority, application Germany, Oct. 24, 1961, T 21,016
3 Claims. (Cl. 340—146.3)

The present invention relates generally to the scanning art, and, more particularly, to arrangements for the proper identification of symbols which are scanned.

Devices for automatically recognizing symbols are known, and in these devices a slot, either actual or an element which may be thought of as a slot, passes over the symbols. The changes in various portions of the symbol surfaces, which may be structure providing a visual indication of the symbol, and which lies beneath the slot at any particular instant, are scanned. A transducer is used, which in optical scanning will be what may be thought of as a light slot, or an optical-electrical transducer, whereas with magnetic scanning, the slot is actually the slot of a magnetic scanning head. The transducer provides a voltage output which changes in dependence upon the changes of the symbol so that an electrical characteristic wave form for each symbol may be obtained at the output terminals of the transducer.

After the symbols are scanned by the transducer wave forms representative thereof are stored in a delay line, after being amplified and after band width limitation such as clipping. The delay line is electrically tapped at equidistant points therealong in order to provide instantaneous voltage values at various equispaced divisions along the characteristic wave form. Correlation networks are provided to aid in the recognition of symbols and one is provided for each of a total of *m* symbols. They are connected in parallel with the taps which, as mentioned above, deliver certain discrete instantaneous voltages in the reference position, which is the position of the wave form in the delay line at a predetermined instant of time.

In one known arrangement, these correlation networks are arranged so that the discrete or instantaneous voltages are added in a rectified condition and the network which is assigned to the symbol present as a wave form in the delay line, delivers a larger output voltage than all the other networks. By comparing the peaks of the summed voltages, delivered by the individual correlation networks, the symbol represented in the delay line may be identified. However, a prerequisite for this arrangement is that the symbol represented must pertain to a given set of symbols which are used, that is, a correlation network must be definitely assigned to each symbol.

However, if the symbol which is present and is being investigated has any desired or random structure, i.e., a symbol foreign to the given set of symbols, a wave form will be present in the delay line which does not correspond to any of the wave forms which are characteristic of the set of symbols. In such an event, each correlation network will deliver a summed output voltage and of these voltages one of them may be larger than all the others. Therefore, this foreign symbol will be incorrectly identified as one of the set of symbols, whereas the symbol which is being scanned is actually not representative of any of the symbols of the set.

Accordingly, the foreign symbol which is present in the line will be incorrectly identified with a symbol from the given set of symbols. This foreign symbol may actually be a symbol from the given set which is greatly deformed, or even be due to a magnetic or other type of disturbance. In order to prevent incorrect identification of symbols, a proposal has been made to provide special correlation networks in addition to the symbol correlation networks proper mentioned above. The special correlation networks are to respond primarily to these disturbances. However, such a proposal assumes that the disturbing symbols which are present and which will be present always posses a very special characteristic shape or form. In order to use such an arrangement to include the broad spectrum of disturbing symbols which are possible, a very large number of special correlation networks must be provided. This results in increased expense, and also the certainty with which the symbols of the set of symbols can be recognized decreases with the increasing number of correlation networks.

With these defects of the prior art in mind, it is a main object of the present invention to provide an arrangement whereby any disturbing signals or strongly deformed symbols may be excluded from the recognition or identification process so that they will not be incorrectly recognized as symbols of the given set of symbols.

Another object of this invention is to provide a device of the character described which is simpler and involves less expenditure than the circuits which have been known heretofore.

These objects and others ancillary thereto are accomplished according to preferred embodiments of the invention wherein a circuit arrangement is provided which is connected with various tapping points along a delay line so that instantaneous or discrete voltages of a characteristic wave form representative of a symbol being scanned will appear at the various points and thereby divide the wave form into a plurality of instantaneous voltages. These voltages are connected to a comparative evaluator which, from the information supplied thereto, sends a signal to a coincidence circuit corresponding to the symbol identified. Furthermore, these voltages are also fed directly to the coincidence circuits in a predetermined arrangement dependent upon the respective characteristic wave forms to detect various characteristic voltages at different portions of the wave form.

Then, since coincidence circuits are being used, the comparative evaluator result must agree with the result of the direct inspection of various characteristics of the instantaneous voltages before there will be recognition, and in this manner proper identification and elimination of incorrect symbols is assured.

Additional objects and advantages of the present invention will become apparent upon consideration of the following description when taken in conjunction with the accompanying drawings in which:

FIGURE 3 is a circuit diagram of the arrangement according to the present invention.

Figure 1:
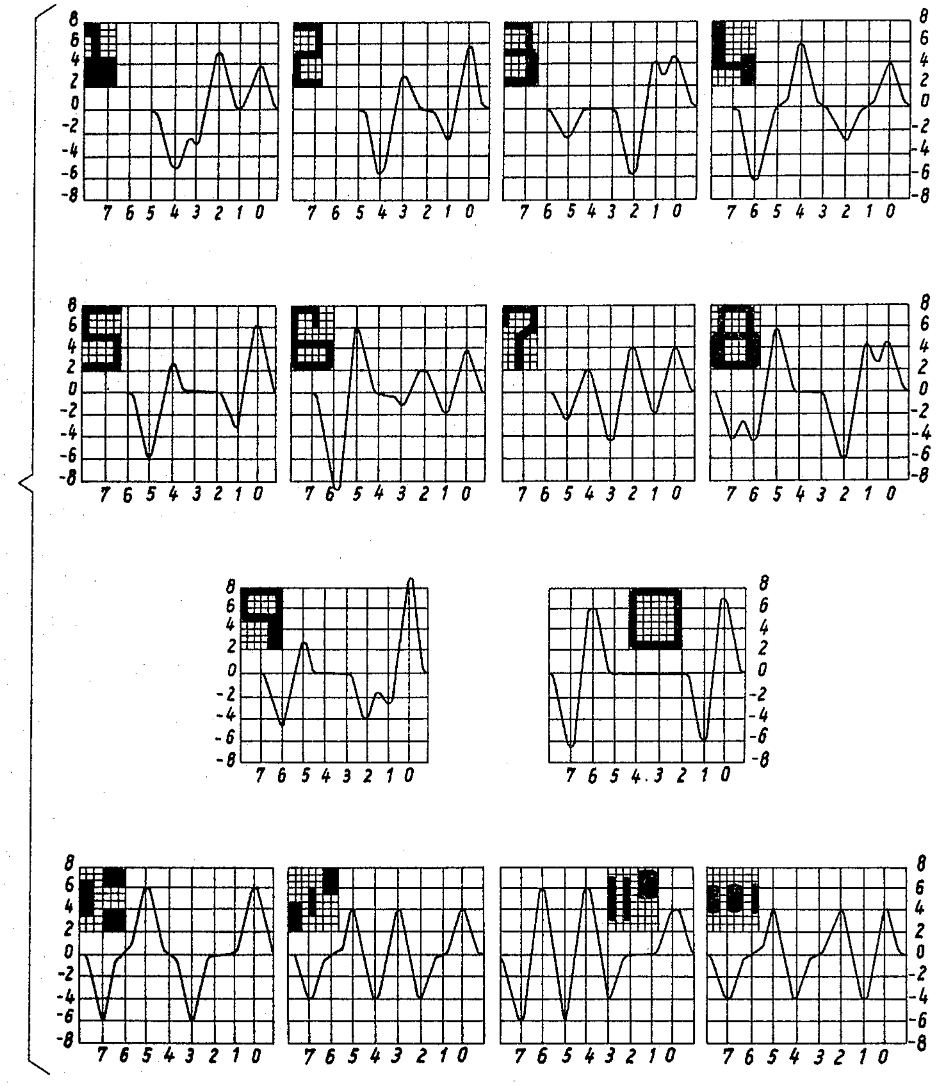
FIGURE 1 is a graphical view illustrating characteristic wave forms of various symbols and indicating the symbols in the corners thereof.

With more particular reference to the drawings, FIGURE 1 illustrates a plurality of symbols which are indicated as being 1 through 9, 0, and four additional symbols. The characteristic wave forms associated with the respective symbols when magnetic scanning of the symbols in magnetic form is used, is shown with the voltages indicated and with the wave being divided time-wise to provided points 0 through 7. The wave form of a symbol being scanned is amplified and subjected to band width limitations and is then stored in a delay line which is tapped at equidistant points in accordance with the points 0 through 7 which, in effect, divide the wave form. Since magnetic scanning is used in the example being considered, the symbols must be printed with a magnetic ink or some other type of magnetic recording of the symbols should be performed in order for them to be capable of being magnetically scanned. FIGURE 1 illustrates the positions of the various wave forms in the delay line at a certain instant of time which will be referred to as the reference position.

The comparative evaluation associated with the decoding of one out of *m* which is carried out in the known correlation process discussed above, only delivers a correct result if a symbol is interrogated which pertains to the predetermined stock of *m* symbols. Accordingly, in order to evaluate with certainty the symbol scanned, from the pulse at the output of the decoding device, the symbol which is present must be guaranteed to pertain to one of the proper symbols of the set of symbols, and this is not achieved in the process which is known.

The present invention then, simultaneously with the correlation comparison, examines whether the symbol which is present pertains to the proper set of symbols. In order to do this, the voltages representing the respective symbols are monitored at the taps of the delay line in the reference position indicated to FIGURE 1. A "1" for example will be recognized only when the output of the decoding device assigned to the digit "1" delivers a pulse, and simultaneously therewith (cf. the wave form of the "1" in FIGURE 1), the taps 0 and 2 deliver positive voltages, taps 3 and 4 deliver negative voltages, and taps 1, 5, 6, and 7 deliver no voltage at all. In an analogous manner recognition of the other symbols of the set of symbols is performed. A suitable conjunctive connection of the different connections may be provided by means of known logical connections.

Figure 2:
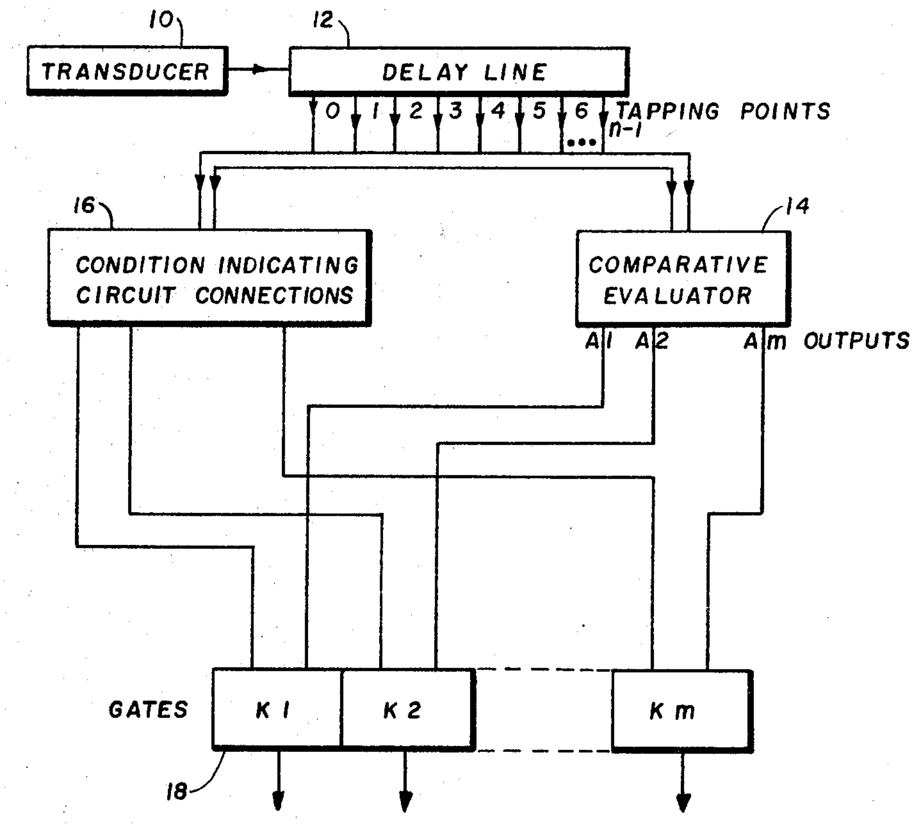
FIGURE 2 is a schematic block diagram of the present invention.

With more particular reference to FIGURE 2, a block diagram of a circuit arrangement is shown.

A transducer 10, such as a magnetic head, scans the symbols which may be provided on a sheet which moves past the transducer. After suitable conditioning of the signals they are fed to delay line 12 where, at the reference instant, the symbol characteristic wave forms shown in FIGURE 1 are present. From the delay line the signals are sent to the comparative evaluator 14 which may be associated with a decoding device having one output line for each symbol, and the symbol which has been scanned is thereby identified. Thus, if a signal appears at output A1 of the group of outputs A1 to A*m* of the comparative evaluator it indicates that symbol "1" has been scanned and this information is fed to gate K1.

An evaluation of this type and the general organization of the transducer and delay line may be of the type disclosed in United States Patent No. 3,000,000 granted September 12, 1961. The comparative evaluator may, for example, take the form of the correlation networks disclosed in U.S. Patent No. 2,924,812.

The same information fed to the comparative evaluator is also fed to condition indicating circuit connections 16 and these connections feed signals to the gates in a predetermined manner and thereby also identify the symbol scanned by providing an input to the corresponding gate. Since the gates 18 are of the coincidence type, there must be simultaneously occurring identifying signals from the connections 16 and also from the evaluator 14 at the input to a gate before it is actuated to thereby identify the scanned signals.

With more particular reference to FIGURE 3, some of the lines 0 . . . *n*—1 from the delay line taps 0 . . . *n*—1 are indicated, and it is assumed that there are *m* symbols in the set. A plurality of coincidence circuits $K_i$ are provided where $i=1, 2, \ldots m$. Each of the coincidence circuits are provided with sections *a*, *b*, *c*, and *d*, having one or more inputs applied thereto, and an output is provided for the coincidence circuit only when all of the input circuits receive the proper signals.

In this arrangement section *a* of the coincidence circuits is connected with the corresponding lines of the identifying device E which includes evaluator 14 and the output section of which is a decoding device. Section *b* of the coincidence circuits is connected for indicating the condition that there are postive voltages or potentials. Section *c* indicates the condition that there is negative voltage. Section *d* indicates the condition that there is no voltage.

The indications of positive voltages, negative voltages and no voltage must be considered with reference to a threshold voltage which is determined by the noise by the noise of the entire system. Therefore, in some instances, in addition to what has been described above, threshold value discriminators should be inserted into the leads from the tapping points of the delay line into the conjunctions.

In principle, in addition to the polarity of the symbol voltages at the tapping points of the delay line, the amounts or magnitudes of the voltages could also be considered during the evaluation. However, in the practical operation of a device, as long as the intensity of the symbols and also the amounts of the voltages are subjected to substantial variations, it is better to omit these additional conditions of voltage magnitudes.

It should be noted that it is not necessary to use all of the tapping points in the manner which is mentioned above, since generally it will be sufficient to evaluate only those voltages which are particularly characteristic for the respective symbol. In the recognition arrangement which is illustrated and the symbols which are used therewith, the voltage at the tapping point 0, for example, is always positive and therefore this voltage does not contribute anything toward discriminating between the different symbols and it will not be used for this purpose. By omitting the less characteristic voltages, the requirements as to the quality of printing are simultaneously lessened.

It will be understood that the above description of the present invention is susceptible to various modifications, changes, and adaptations, and the same are intended to be comprehended within the meaning and range of equivalents of the appended claims.

What is claimed is:

1. A device for recognizing symbols of a set of symbols, each capable of providing a transducer with a different wave form, said device comprising, in combination:

(a) transducer means for scanning symbols of a set of symbols for generating a different electrical energy wave form for each symbol;

(b) circuit means connected to said scanning means for electrically dividing said wave forms so that the instantaneous energy of the wave form appears at each division;

(c) a set of coincidence circuits, one corresponding to each symbol;

(d) a decoder connected between said circuit means and said coincidence circuits providing a signal to the coincidence circuit corresponding to the scanned symbol; and (e) means connected to said circuit means and said coincidence circuits for delivering the instantaneous energy thereto to actuate, in conjunction with said decoder, only the proper coincidence circuit in dependence upon the instantaneous energy signals and on the decoder signals.

2. In a combination for recognizing symbols and including a set of symbols, each of which is capable of providing a transducer with a different wave form, a transducer for scanning the symbols for generating a different electrical energy wave form for each symbol, a circuit arrangement connected to the transducer for electrically dividing said wave forms so that the instantaneous energy of the wave form appears at each division, the improvement comprising:

(a) a set of coincidence circuits, one corresponding to each symbol;

(b) a comparative evaluator connectable to the circuit arrangement and connected to said coincidence circuits for providing a signal to the coincidence circuit which is representative of the scanned symbol; and (c) means connectable to the circuit arrangement and connected to said coincidence circuits for delivering instantaneous energy signals thereto which actuate the coincidence circuit corresponding to the symbol being scanned in dependence upon the instantaneous energy signals and on the comparative evaluator signals.

3. A device for automatic symbol recognition by scanning symbols to be recognized for providing wave forms which are characeristic of the symbols, comprising, in combination:

a delay line to which the wave forms are fed and having a plurality of tap points at which discrete voltages significant of the wave forms of the symbols appear;

means in the form of voltage summing networks connected to said delay line for comparatively evaluating the discrete voltages appearing at said tap points and having output channels which pertain to individual symbols and which signal when individual symbols are recognized;

a plurality of coincidence circuits having first inputs respectively connected to said output channels and second inputs; and means connected to said tap points and said coincidence circuits for providing to the coincidence circuits signals derived from a selection of discrete voltages available at the tap points of the delay line as being positive, negative, and zero voltage, so that for each symbol of a set of identifiable symbols there is connected to the second inputs of the coincidence circuits a selection of tape points on the delay line adapted to the specific characteristics of the wave form of just that symbol.

References Cited by the Examiner

UNITED STATES PATENTS

| | | | |
|---|---|---|---|
| 2,482,544 | 9/1949 | Jacobson ---------- | 340—146.3 |
| 2,924,812 | 2/1960 | Merritt et al. ------ | 340—146.3 |
| 3,112,469 | 11/1963 | Milford ----------- | 340—146.3 |

DARYL W. COOK, *Assistant Primary Examiner.*

MALCOLM A. MORRISON, *Examiner.*

J. S. IANDIORIO, *Assistant Examiner.*